United States Patent
Kaneshige et al.

(12)

(10) Patent No.: US 6,214,779 B1
(45) Date of Patent: Apr. 10, 2001

(54) LUBRICATING OIL OR LUBRICATING OIL COMPOSITION AND FUEL OIL COMPOSITION

(75) Inventors: Ryousuke Kaneshige; Hideki Hirano; Masahide Tanaka, all of Ichihara; Kenichi Morizono; Keiji Okada, both of Kuga-gun, all of (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/101,335
(22) PCT Filed: Jan. 21, 1998
(86) PCT No.: PCT/JP98/00212
  § 371 Date: Jul. 7, 1998
  § 102(e) Date: Jul. 7, 1998
(87) PCT Pub. No.: WO98/33872
  PCT Pub. Date: Aug. 6, 1998

(30) Foreign Application Priority Data

Jan. 31, 1997 (JP) .......................................... 9-19506
Jan. 31, 1997 (JP) .......................................... 9-19507
Feb. 12, 1997 (JP) .......................................... 9-27631

(51) Int. Cl.$^7$ ................................................ C10M 101/02
(52) U.S. Cl. ............................................ 508/591; 585/11
(58) Field of Search ............................... 508/591; 585/11

(56) References Cited

U.S. PATENT DOCUMENTS 4,967,029  * 10/1990 Wu ......................................... 585/12
5,321,106     6/1994 LaPointe .

FOREIGN PATENT DOCUMENTS 0452998A   10/1991 (EP) .
0870801A   10/1998 (EP) .
58-011511   1/1983 (JP) .
1502036    7/1989 (JP) .
278687     3/1990 (JP) .
WO9111488  8/1991 (WO) .

* cited by examiner

*Primary Examiner*—Margaret Medley
*Assistant Examiner*—Cephia D. Toomer
(74) *Attorney, Agent, or Firm*—Birch, Stewart, Kolasch & Birch, LLP

(57) ABSTRACT

The present invention is directed towards a lubricating oil comprising a random copolymer of an α-olefin/aromatic vinyl compound, wherein the copolymer has a viscosity falling within a specific range and comprises ethylene, an aromatic vinyl compound, and optionally an α-olefin. The lubricating oil possesses excellent viscosity properties, thermal stability, oxidation stability, abrasion resistance, and compatibility with lubricating oil additives. The random copolymer having a different viscosity range is useful as a viscosity index improver and a compatibilizing agent for a lubricating oil. The invention also provides a lubricating oil composition comprising a base oil and the viscosity index improver or the compatibilizing agent. The invention further provides a fuel oil composition comprising a fuel oil fluidity improver based on the above random copolymer having a different viscosity range and a middle fraction fuel oil having a boiling point of 150 to 400° C. The fuel oil composition prevents an increase in viscosity of the middle fraction fuel oil, lowers the clogging point and the flow point in a low-temperature filter, and inhibits the abrasion of a fuel jet nozzle.

1 Claim, No Drawings

LUBRICATING OIL OR LUBRICATING OIL COMPOSITION AND FUEL OIL COMPOSITION

This application claims the benefit under 35 U.S.C. §371 of prior PCT International Application No. PCT/JP98/00212 which has an International filing date of Jan. 21, 1998 which designated the United States of America, the entire contents of which are hereby incorporated by references.

TECHNICAL FIELD

The present invention relates to lubricating oils and lubricating oil compositions. More particularly, the invention relates to lubricating oils comprising an α-olefin/aromatic vinyl compound random copolymer, lubricating oil compositions comprising the copolymer, and lubricating oil compositions comprising a base oil composed of a mineral oil and/or a hydrocarbon synthetic oil and an α-olefin/aromatic vinyl compound random copolymer.

The present invention also relates to lubricating oil viscosity index improvers and lubricating oil compatibility improvers each comprising an α-olefin/aromatic vinyl compound random copolymer.

The present invention further relates to fuel oil compositions having lubricating properties, which comprise a middle fraction fuel oil and an α-olefin/aromatic vinyl compound random copolymer.

BACKGROUND ART

Lubricating base oils, which comprise a mineral oil contained in petroleum or a synthetic oil such as an ethylene/α-olefin copolymer, have been hitherto known. Further, lubricating oil compositions containing a viscosity index improver or a lubricating oil additive each comprising an α-olefin polymer are also known.

The lubricating base oils are desired to be excellent not only in viscosity properties (particularly low-temperature fluidity) but also in heat stability, oxidation stability and lubricating properties.

The lubricating base oils are blended with additives such as an extreme pressure agent, but the lubricating base oils, particularly hydrocarbon synthetic oils, usually have poor compatibility with the lubricating oil additives, and therefore the kind and the amount of the viscosity index improver or the lubricating oil additives added to the lubricating oils have been markedly limited.

Lubricating oil compositions wherein esters are added as compatibility improvers to improve the compatibility of the lubricating base oils with the lubricating oil additives are known.

Even the lubricating oil compositions containing the viscosity index improver or the compatibility improver are desired to be further improved in the heat stability, oxidation stability, lubricating properties and compatibility with the lubricating oil additives. Further, lubricating base oils, which show sufficient compatibility with the lubricating oil additives even if no compatibility improver is used, are desired.

By the way, when middle fraction fuel oils such as gas oil (light oil) and heavy oil are used or stored at low temperatures, crystals of waxes contained in the oils grow. If oils containing grown wax crystals are used, problems such as plugging (clogging) of pipes and extreme increase of viscosity of the whole oil to cause difficulty of oil flow are brought about. To cope with the problems, addition of a fluidity improver such as an ethylene/α-olefin copolymer to the middle fraction fuel oils is known.

It is also known to add polybutadiene having hydroxyl end group and containing not less than 70% of 1,2-bonds or its hydrogenated product to the middle fraction fuel oils to lower a cold filter plugging point (CFPP).

For purifying automobile exhaust gas, a low-sulfur gas oil, that is a diesel gas oil having a decreased sulfur content, tends to be used, and legal regulation is becoming severe. However, sulfur in the fuel oil contributes to lubricating properties of the fuel oil, and if the sulfur content in the fuel oil is decreased, the lubricating properties of the fuel oil are sometimes lowered to thereby cause abrasion of fuel injection nozzles. Accordingly, fuel oil fluidity improvers having excellent lubricating properties are desired.

The present invention has been made under such circumstances as mentioned above, and it is an object of the invention to provide a lubricating oil and a lubricating oil composition each of which is excellent not only in compatibility with lubricating oil additives but also in viscosity properties, heat stability, oxidation stability and lubricating properties.

It is another object of the invention to provide a lubricating oil composition having excellent properties, which comprises a base oil composed of a mineral oil and/or a hydrocarbon synthetic oil and a viscosity index improver comprising a specific α-olefin/aromatic vinyl compound random copolymer.

It is a further object of the invention to provide a lubricating oil composition having excellent properties, which comprises a base oil composed of a mineral oil and/or a hydrocarbon synthetic oil, a compatibility improver comprising a specific low-molecular weight α-olefin/aromatic vinyl compound random copolymer and a lubricating oil additive.

It is a still further object of the invention to provide a viscosity index improver comprising a specific α-olefin/aromatic vinyl compound random copolymer, and a lubricating oil compatibility improver comprising a specific low-molecular weight α-olefin/aromatic vinyl compound random copolymer.

DISCLOSURE OF THE INVENTION

The lubricating oil according to the present invention comprises an α-olefin/aromatic vinyl compound random copolymer comprising:

40 to 75% by mol of constituent units derived from ethylene, 0 to 45% by mol of constituent units derived from an α-olefin of 3 to 20 carbon atoms, and 1 to 40% by mol of constituent units derived from an aromatic vinyl compound, with the proviso that the total amount of the constituent units derived from ethylene and the constituent units derived from the α-olefin is 60 to 99% by mol, said α-olefin/aromatic vinyl compound random copolymer having an intrinsic viscosity [η], as measured in decalin at 135° C., of 0.01 to 0.50 dl/g.

The first lubricating oil composition according to the present invention comprises the α-olefin/aromatic vinyl compound random copolymer and a lubricating oil additive.

When the α-olefin/aromatic vinyl compound random copolymer is used as a lubricating base oil and blended with at least one additive selected from an extreme pressure agent, an abrasion resistance agent, an oiliness improver and a detergent-dispersant, a lubricating oil composition having excellent properties can be obtained.

The second lubricating oil composition according to the present invention comprises:

a base oil comprising a mineral oil and/or a hydrocarbon synthetic oil, and an α-olefin/aromatic vinyl compound random copolymer which comprises 40 to 75% by mol of constituent units derived from ethylene, 0 to 45% by mol of constituent units derived from an α-olefin of 3 to 20 carbon atoms and 1 to 40% by mol of constituent units derived from an aromatic vinyl compound, with the proviso that the total amount of the constituent units derived from ethylene and the constituent units derived from the α-olefin is 60 to 99% by mol, and has an intrinsic viscosity [η], as measured in decalin at 135° C., of 0.1 to 5.0 dl/g.

The third lubricating oil composition according to the present invention comprises:

a base oil comprising a mineral oil and/or a hydrocarbon synthetic oil, a low-molecular weight α-olefin/aromatic vinyl compound random copolymer which comprises 40 to 75% by mol of constituent units derived from ethylene, 0 to 45% by mol of constituent units derived from an α-olefin of 3 to 20 carbon atoms and 1 to 40% by mol of constituent units derived from an aromatic vinyl compound, with the proviso that the total amount of the constituent units derived from ethylene and the constituent units derived from the α-olefin is 60 to 99% by mol, and has an intrinsic viscosity [η], as measured in decalin at 135° C., of 0.01 to 0.30 dl/g, and a lubricating oil additive.

The viscosity index improver according to the present invention comprises the same α-olefin/aromatic vinyl compound random copolymer as the specific α-olefin/aromatic vinyl compound random copolymer employable in the second lubricating oil composition.

The lubricating oil compatibility improver according to the present invention comprises the same low-molecular weight α-olefin/aromatic vinyl compound random copolymer as the specific low-molecular weight α-olefin/aromatic vinyl compound random copolymer employable in the third lubricating oil composition.

The fuel oil composition according to the present invention comprises:

a middle fraction fuel oil having a boiling point of 150 to 400° C., and an α-olefin/aromatic vinyl type fuel oil fluidity improver comprising an α-olefin/aromatic vinyl compound random copolymer which comprises 60 to 90% by mol of constituent units derived from ethylene, 0 to 39% by mol of constituent units derived from an α-olefin of 3 to 20 carbon atoms and 1 to 40% by mol of constituent units derived from an aromatic vinyl compound, with the proviso that the total amount of the constituent units derived from ethylene and the constituent units derived from the α-olefin is 60 to 99% by mol, and has an intrinsic viscosity [η], as measured in decalin at 135° C., of 0.01 to 1.0 dl/g.

BEST MODE FOR CARRYING OUT THE INVENTION

The lubricating oil, the lubricating oil composition, the viscosity index improver, the lubricating oil compatibility improver and the fuel oil composition according to the invention are described in detail hereinafter.

First, the lubricating oil according to the invention is described.

The lubricating oil of the invention comprises an α-olefin/aromatic vinyl compound random copolymer obtained from ethylene, an aromatic vinyl compound, and optionally, an α-olefin of 3 to 20 carbon atoms.

α-Olefin/Aromatic Vinyl Compound Random Copolymer

The α-olefin/aromatic vinyl compound random copolymer for use in the invention is a random copolymer of ethylene and an aromatic vinyl compound (ethylene/aromatic vinyl compound random copolymer) or a random copolymer of ethylene, an α-olefin of 3 to 20 carbon atoms and an aromatic vinyl compound (ethylene/α-olefin/aromatic vinyl compound random copolymer).

In the ethylene/aromatic vinyl compound random copolymer, the amount of constituent units derived from ethylene is in the range of 60 to 75% by mol, preferably 60 to 70% by mol, and the amount of constituent units derived from the aromatic vinyl compound is in the range of 25 to 40% by mol, preferably 30 to 40% by mol.

Examples of the aromatic vinyl compounds include styrene; mono- or polyalkylstyrenes, such as o-methylstyrene, m-methylstyrene, p-methylstyrene, o,p-dimethylstyrene, o-ethylstyrene, m-ethylstyrene and p-ethylstyrene; functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; 3-phenylpropylene; 4-phenylbutene; and α-methylstyrene. Of these, preferable is styrene or 4-methoxystyrene.

In the ethylene/aromatic vinyl compound random copolymer, α-olefins other than ethylene and the vinyl aromatic compound may be copolymerized. Examples of such α-olefins include α-olefins of 3 to 20 carbon atoms, such as propylene, 1-butene, 3-methyl-1-butene, 4-methyl-1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. Of these, preferable is propylene, 1-butene, 1-pentene, 1-hexene or 1-octene. These α-olefins can be used singly or in combination of two or more kinds.

In the ethylene/α-olefin/aromatic vinyl compound random copolymer, the amount of constituent units derived from ethylene is in the range of 40 to 75% by mol, the amount of constituent units derived from the α-olefin of 3 to 20 carbon atoms is in the range of not more than 45% by mol, and the amount of constituent units derived from the aromatic vinyl compound is in the range of 1 to 40% by mol, with the proviso that the total amount of the constituent units derived from ethylene and the constituent units derived from the α-olefin is in the range of 60 to 99% by mol. It is preferable that the amount of constituent units derived from ethylene is in the range of 40 to 70% by mol, the amount of constituent units derived from the α-olefin of 3 to 20 carbon atoms is in the range of not more than 40% by mol, and the amount of constituent units derived from the aromatic vinyl compound is in the range of 1 to 30% by mol, with the proviso that the total amount of the constituent units derived from ethylene and the constituent units derived from the α-olefin is in the range of 70 to 99% by mol.

When the amount of the constituent units derived from ethylene, the amount of the constituent units derived from the α-olefin of 3 to 20 carbon atoms and the amount of the constituent units derived from the aromatic vinyl compound are within the above ranges, a lubricating base oil having good balance of various properties such as viscosity properties, heat resistance and lubricating properties can be obtained.

Of such copolymers as mentioned above, preferable is an α-olefin/aromatic vinyl compound random copolymer wherein the total amount of the constituent units derived from the α-olefin of 3 to 20 carbon atoms and the constituent units derived from the aromatic vinyl compound is in the range of 0.1 to 40% by mol.

In the α-olefin/aromatic vinyl compound random copolymer, other monomers such as non-conjugated dienes may be copolymerized. Examples of the non-conjugated dienes include 1,4-pentadiene, 1,4-hexadiene, 4-methyl-1,5-heptadiene, 5-methylene-2-norbornene, 5-ethylidene-2-norbornene, 5-isopropenyl-2-norbornene, 2,5-norbornadiene, 1,6-cyclooctadiene, 2-ethylene-2,5-norbornadiene, 2-isopropenyl-2,5-norbornadiene, dicyclopentadiene, 1,6-octadiene, 1,7-octadiene, tricyclopentadiene, and esters of dihydrodicyclopentadienyloxyethylene and unsaturated carboxylic acids (e.g., acrylic acid, methacrylic acid, itaconic acid, maleic acid and fumaric acid). These non-conjugated dienes can be used singly or in combination of two or more kinds.

The α-olefin/aromatic vinyl compound random copolymer has an intrinsic viscosity [η], as measured in decalin at 135° C., of 0.01 to 0.50 dl/g, preferably 0.02 to 0.40 dl/g.

In the α-olefin/aromatic vinyl compound random copolymer for use in the invention, the proportion of the constituent units for forming sequences of two constituent units derived from the aromatic vinyl compound to all the constituent units derived from the aromatic vinyl compound is desired to be not more than 1%, preferably not more than 0.1%. The proportion of the sequences of two constituent units derived from the aromatic vinyl compound can be determined by means of $^{13}$C-NMR.

The process for preparing the α-olefin/aromatic vinyl compound random copolymer will be described later.

The lubricating oil of the invention comprising the α-olefin/aromatic vinyl compound random copolymer is excellent in compatibility with additives as well as in viscosity properties, heat stability, oxidation stability and abrasion resistance.

Next, the first lubricating oil composition according to the invention is described.

The first lubricating oil composition of the invention comprises a lubricating base oil, which comprises the same α-olefin/aromatic vinyl compound random copolymer as used for forming the above-mentioned lubricating oil, and a lubricating oil additive.

Lubricating Oil Additive

The lubricating oil additive for use in the invention is at least one additive selected from an extreme pressure agent, an abrasion resistance agent, an oiliness improver and a detergent-dispersant.

Examples of the extreme pressure agents include sulfur type extreme pressure agents, such as sulfides, sulfoxides, sulfones, thiophosphinates, thiocarbonates, fats and oils, sulfurized fats and oils, and olefin sulfides; phosphoric acids, such as phosphoric esters, phosphorous esters, phosphoric ester amines and phosphorous ester amines; and halogen compounds, such as chlorinated hydrocarbons.

Examples of the abrasion resistance agent include inorganic or organic molybdenum compounds, such as molybdenum disulfide; organoboron compounds, such as alkylmercaptyl borate; graphite; antimony sulfide; boron compounds; and polytetrafluoroethylene.

Examples of the oiliness improvers include higher fatty acids, such as oleic acid and stearic acid; higher alcohols, such as oleyl alcohol; amines; esters; sulfurized fats and oils; and chlorinated fats and oils.

Examples of the detergent-dispersants include metallic sulfonates, such as calcium sulfonate, magnesium sulfonate and barium sulfonate; thiophosphonates; phenates; salicylates; succinimides; benzylamine; and succinates.

The first lubricating oil composition of the invention may further contain a viscosity index improver, an antioxidant, an anti-corrosion agent and an anti-foaming agent.

As the viscosity index improvers, those generally added to lubricating oils are available, and examples thereof include natural resins, such as mineral oil, and synthetic resins, such as ethylene/α-olefin copolymer, α-olefin homopolymer, styrene/butadiene copolymer, poly(meth)acrylate and naphthalene condensate.

Examples of the antioxidants include amine compounds, such as 2,6-di-t-butyl-4-methylphenol; and sulfur or phosphorus compounds, such as zinc dithiophosphate.

Examples of the anti-corrosion agents include carboxylic acids and their salts, such as oxalic acid; sulfonates; esters; alcohols; phosphoric acid and its salts; benzotriazole and its derivatives; and thiazole compounds.

Examples of the anti-foaming agents include silicone compounds, such as dimethylsiloxane and silica gel dispersion; alcohol compounds; and ester compounds.

Though the amount of the lubricating oil additive used varies depending on the lubricating properties requested, it is in the range of usually 0.01 to 80 parts by weight, preferably 0.05 to 60 parts by weight, based on 100 parts by weight of the α-olefin/aromatic vinyl compound random copolymer.

The lubricating oil composition of the invention may further contain a mineral oil or a hydrocarbon synthetic oil in an amount of up to 50% by weight.

Since the first lubricating oil composition of the invention contains the α-olefin/aromatic vinyl compound random copolymer as a base oil, the composition is excellent in compatibility with additives as well as in viscosity properties, heat stability, oxidation stability and abrasion resistance.

Next, the second lubricating oil composition and the viscosity index improver according to the invention are described.

The second lubricating oil composition of the invention comprises a base oil, which comprises a mineral oil and/or a hydrocarbon synthetic oil, and a specific α-olefin/aromatic vinyl compound random copolymer functioning as a viscosity index improver.

The viscosity index improver of the invention comprises the same α-olefin/aromatic vinyl compound random copolymer as used in the second lubricating oil composition of the invention.

Base Oil

The base oil used in the second lubricating oil composition of the invention is a lubricating base oil comprising a mineral oil and/or a hydrocarbon synthetic oil. These oils can be used alone or as a mixture of two or more kinds without specific limitation, as far as they have a viscosity at 100° C. of 1.5 to 40.0 mm$^2$/S, preferably 2.0 to 10.0 mm$^2$/S.

The mineral oil has a viscosity in the above range.

The mineral oil is, for example, a refined oil obtained by subjecting a paraffin base crude oil or an intermediate base crude oil to atmospheric distillation or subjecting a residual oil of the atmospheric distillation to vacuum distillation and then refining the resulting distillate oil in a conventional manner, or a deep-dewaxed oil obtained by deep-dewaxing the refined oil obtained above. Examples of the refining methods include hydrogenation, dewaxing, solvent extraction, alkali distillation, sulfuric acid washing and clay treatment. These methods can be carried out singly or in appropriate combination, or the same method can be repeated plural times. In these cases, there is no specific limitation on the order of the methods and the number of repetition times. In the present invention, it is particularly preferable to use a mineral oil obtained by a solvent dewaxing process that is made under severe conditions or obtained by a deep-dewaxing process such as a catalytic hydrogenation dewaxing process using a zeolite catalyst.

Examples of the hydrocarbon synthetic oils preferably used include oligomers obtained by polymerizing or copolymerizing olefins of 2 to 20 carbon atoms or arbitrary mixtures of these olefins, such as an oligomer of 1-octene, an oligomer of 1-decene and an oligomer of 1-dodecene. In addition to the mineral oil and/or the hydrocarbon synthetic oil, also available are diesters, such as di-2-ethylhexyl sebacate, dioctyl adipate and dioctyl dodecanoate, and polyol esters, such as pentaerythritol tetraoleate and trimethylolpropane tripelargonate.

The oligomers are obtained by (co)polymerizing olefins of 2 to 20 carbon atoms by conventional processes.

In the second lubricating oil composition of the invention, the base oil is used in an amount of 50.0 to 99.8% by weight, preferably 60.0 to 95.0% by weight.

α-Olefin/Aromatic Vinyl Compound Random Copolymer

In the second lubricating oil composition of the invention, a specific α-olefin/aromatic vinyl compound random copolymer functioning as a viscosity index improver is used as the base oil or the viscosity index improver. This copolymer is similar to the α-olefin/aromatic vinyl compound random copolymer for forming the lubricating oil or the first lubricating oil composition of the invention mentioned above, and is a random copolymer of ethylene and an aromatic vinyl compound (ethylene/aromatic vinyl compound random copolymer) or a random copolymer of ethylene, an α-olefin of 3 to 20 carbon atoms and an aromatic vinyl compound (ethylene/α-olefin/aromatic vinyl compound random copolymer).

The α-olefin/aromatic vinyl compound random copolymer for use in the second lubricating oil composition of the invention, however, has an intrinsic viscosity $[\eta]$, as measured in decalin at 135° C., of 0.1 to 5.0 dl/g, preferably 0.5 to 3.0 dl/g.

The amount of the α-olefin/aromatic vinyl compound random copolymer functioning as the viscosity index improver is in the range of 1.0 to 50.0 parts by weight, preferably 2.0 to 30.0 parts by weight, based on 100 parts by weight of the base oil.

The second lubricating oil composition of the invention has excellent lubricating oil properties because the base oil comprising the mineral oil and/or the hydrocarbon synthetic oil is blended with the α-olefin/aromatic vinyl compound random copolymer functioning as the base oil or the viscosity index improver.

Next, the third lubricating oil composition and the lubricating oil compatibility improver according to the invention are described.

The third lubricating oil composition of the invention comprises a base oil, which comprises a mineral oil and/or a hydrocarbon synthetic oil, a specific low-molecular weight α-olefin/aromatic vinyl compound random copolymer functioning as a compatibility improver, and a lubricating oil additive.

The lubricating oil compatibility improver according to the invention is the same α-olefin/aromatic vinyl compound random copolymer as used for forming the third lubricating oil composition of the invention.

Base Oil

Examples of the base oils include the aforesaid mineral oils and hydrocarbon synthetic oils employable as the base oil of the second lubricating oil composition.

α-Olefin/Aromatic Vinyl Compound Random Copolymer

In the third lubricating oil composition of the invention, a specific low-molecular weight α-olefin/aromatic vinyl compound random copolymer functioning as a compatibility improver is employed. This copolymer is similar to the α-olefin/aromatic vinyl compound random copolymer for forming the lubricating oil or the first lubricating oil composition of the invention mentioned above, and is a random copolymer of ethylene and an aromatic vinyl compound (ethylene/aromatic vinyl compound random copolymer) or a random copolymer of ethylene, an α-olefin of 3 to 20 carbon atoms and an aromatic vinyl compound (ethylene/α-olefin/ aromatic vinyl compound random copolymer). The low-molecular weight α-olefin/aromatic vinyl compound random copolymer for use in the third lubricating oil composition of the invention, however, has an intrinsic viscosity $[\eta]$, as measured in decalin at 135° C., of 0.01 to 0.30 dl/g, preferably 0.01 to 0.20 dl/g.

By the use of the low-molecular weight α-olefin/aromatic vinyl compound random copolymer functioning as the compatibility improver, the lubricating oil additive can be easily dissolved in the base oil.

The amount of the α-olefin/aromatic vinyl compound random copolymer functioning as the compatibility improver is more than 0 part by weight and not more than 50 parts by weight, preferably more than 0 part by weight and not more than 30 parts by weight, based on 100 parts by weight of the base oil.

The weight ratio of the low-molecular weight α-olefin/ aromatic vinyl compound random copolymer to the lubricating oil additive is in the range of 0.01 to 4.0, preferably 0.01 to 2.0.

Lubricating Oil Additive

The third lubricating oil composition of the invention contains a lubricating oil additive, such as the aforesaid extreme pressure agent, an abrasion resistance agent, oiliness improver, detergent-dispersant, antioxidant, anti-corrosion agent or anti-foaming agent.

Though the amount of the lubricating oil additive used varies depending on the lubricating properties requested, it is in the range of usually 0.01 to 50% by weight, preferably 0.05 to 30% by weight in the lubricating oil composition.

The third lubricating oil composition of the invention has excellent lubricating oil properties because the base oil comprising the mineral oil and/or the hydrocarbon synthetic oil is blended with the lubricating oil additive and the low-molecular weight α-olefin/aromatic vinyl compound random copolymer functioning as the base oil or the compatibility improver.

Next, a process for preparing the α-olefin/aromatic vinyl compound random copolymer is described.

The (low-molecular weight) α-olefin/aromatic vinyl compound random copolymer for use in the invention can be prepared by copolymerizing ethylene, the aromatic vinyl compound, and if necessary, an α-olefin of 3 to 20 carbon atoms, in the presence of, for example, a metallocene catalyst (a).

As the metallocene catalyst (a), various metallocene type catalysts, such as those currently used as single site catalysts and those analogous thereto, can be employed without specific limitation. In particular, a catalyst comprising a metallocene compound (b) of a transition metal (transition metal compound), and an organoaluminum oxy-compound (c) and/or an ionizing ionic compound (d) is preferably employed.

The metallocene compound (b) is, for example, a metallocene compound of a transition metal selected from Group 4 of the periodic table (long-form periodic table) of elements indicated by Group No. 1 to 18 according to IUPAC Inorganic Nomenclature Rules, revised edition, (1989), specifically a metallocene compound represented by the following formula (1)

$$ML_x \quad (1)$$

In the formula (1), M is a transition metal selected from elements of Group 4 of the periodic table, e.g., zirconium, titanium or hafnium, and x is a valence of the transition metal.

L is a ligand coordinated to the transition metal. At least one ligand L is a ligand having a cyclopentadienyl skeleton which may have a substituent.

Examples of the ligands having a cyclopentadienyl skeleton include alkyl or cycloalkyl substituted cyclopentadienyl groups, such as cyclopentadienyl, methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl.

Further, an indenyl group, a 4,5,6,7-tetrahydroindenyl group and a fluorenyl group can be also mentioned.

Those groups may be substituted with halogen atoms or trialkylsilyl groups.

Of the above ligands, particularly preferred are alkyl substituted cyclopentadienyl groups.

When the compound represented by the formula (1) has two or more ligands L having a cyclopentadienyl skeleton, two of the ligands having a cyclopentadienyl skeleton may be bonded to each other through an alkylene group such as ethylene or propylene, a substituted alkylene group such as isopropylidene and diphenylmethylene, a silylene group, or a substituted silylene group such as dimethylsilylene, diphenylsilylene or methylphenylsilylene.

Examples of L other than the ligand having a cyclopentadienyl skeleton include a hydrocarbon group of 1 to 12 carbon atoms, an alkoxy group, an aryloxy group, a sulfonic acid-containing group ($-SO_3R^1$), a halogen atom or hydrogen atom, where $R^1$ is an alkyl group, an alkyl group substituted with a halogen atom, an aryl group, or an aryl group substituted with a halogen atom or an alkyl group.

Examples of the hydrocarbon groups of 1 to 12 carbon atoms include alkyl groups, cycloalkyl groups, aryl groups and aralkyl groups, more specifically, there can be mentioned:

alkyl groups, such as methyl, ethyl, n-propyl, isopropyl, n-butyl, isobutyl, sec-butyl, t-butyl, pentyl, hexyl, octyl, decyl and dodecyl;

cycloalkyl groups, such as cyclopentyl and cyclohexyl;

aryl groups, such as phenyl and tolyl; and aralkyl group, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

The aryloxy group is, for example, phenoxy.

Examples of the sulfonic acid-containing group ($-SO_3R^1$) include methanesulfonato, p-toluenesulfonato, trifluoromethansulfonate and p-chlorobenzenesulfonato.

Examples of the halogen atoms include fluorine, chlorine, bromine and iodine.

The metallocene compound (b) of the above formula (1) wherein the valence of the transition metal is 4 is more specifically represented by the following formula (2):

$$R^2_k R^3_l R^4_m R^5_n M \quad (2)$$

wherein M is the above-mentioned transition metal, preferably zirconium or titanium, $R^2$ is a group (ligand) having a cyclopentadienyl skeleton, $R^3$, $R^4$ and $R^5$ may be the same or different, and are each independently a group having a cyclopentadienyl skeleton or the same as L other than the ligand having a cyclopentadienyl skeleton in the above formula (1), k is an integer of not less than 1, and k+l+m+n=4.

In the present invention, a compound represented by the following formula (3) can be also employed as the metallocene compound (b).

$$L^1 M^2 Z^1_2 \quad (3)$$

wherein, $M^2$ is a metal of Group 4 of the periodic table or a metal of lanthanide series;

$L^1$ is a derivative of delocalization π bond group and imparts restraint geometrical shape to the metal $M^2$ active site; and the $Z^1$'s are the same or different, and are each independently hydrogen, halogen, a hydrocarbon group of 20 or less carbon, silicon or germanium atoms, a silyl group or a germyl group.

Of the metallocene compounds (b) of the formula (3), preferred are metallocene compounds represented by the following formula (4).

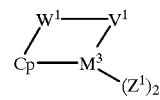

(4)

In the formula (4), $M^3$ is titanium, zirconium or hafnium, and $Z^1$ is the same as above.

Cp is a cyclopentadienyl group which is π-bonded to $M^3$ in the $\eta^5$ bonding way, a substituted cyclopentadienyl group or a derivative thereof.

$W^1$ is oxygen, sulfur, boron, an element of Group 14 of the periodic table or a group containing any of these elements.

$V^1$ is a ligand containing nitrogen, phosphorus, oxygen or sulfur.

$W^1$ and $V^1$ may form together a fused ring. Further, Cp and $W^1$ may form together a fused ring.

Examples of preferred groups indicated by Cp in the formula (4) include a cyclopentadienyl group, an indenyl group, a fluorenyl group and saturated derivatives of these groups. These groups or derivatives form a ring together with the metal atom ($M^3$).

Each carbon atom in the cyclopentadienyl group may be substituted or unsubstituted with the same or a different group selected from the group consisting of hydrocarbyl groups, substituted-hydrocarbyl groups wherein one or more hydrogen atoms is replaced by a halogen atom, hydrcarbyl-substituted metalloid groups wherein the metalloid is selected from Group 14 of the Periodic Table of the Elements, and halogen groups. In addition, two or more of the substituent groups may form together a fused ring. The preferred hydrocarbyl and substituted hydrocarbyl groups, which may be substituted for at least one hydrogen atom in the cyclopentadienyl group, will contain from 1 to 20 carbon atoms, and include straight and branched alkyl groups, cyclic hydrocarbon groups, alkyl-substituted cyclic hydrocarbon groups, aromatic groups and alkyl-substituted aromatic groups. Examples of the preferred organometalloid groups include mono-, di- and tri-substituted organometalloid groups of Group 14 elements, and each of the hydrocarbyl groups has 1 to 20 carbon atoms. Particular examples of the preferred organometalloid groups include trimethylsilyl, triethylsilyl, ethyldimethylsilyl, methyldiethylsilyl, phenyldimethylsilyl, methyldiphenylsilyl, triphenylsilyl, triphenylgermyl and trimethylgermyl.

Examples of the groups indicated by $Z^1$ in the formula (4) include hydrido, halo, alkyl, silyl, germyl, aryl, amido, aryloxy, alkoxy, phosphido, sulfido, acyl, pseudohalido (e.g., cyanide, azido), acetylacetonato and mixtures thereof. The groups indicated by $Z^1$ may be the same as or different from each other.

As the metallocene compound (b), the metallocene compound represented by the formula (3) is particularly preferable from the viewpoints of polymerization activity and transparency, rigidity, heat resistance and impact resistance of the resulting molded product. The metallocene compounds (b) mentioned above may be used singly or in combination of two or more kinds.

The metallocene compound (b) for use in the invention may be diluted with a hydrocarbon or a halogenated hydrocarbon prior to use.

Next, the organoaluminum oxy-compound (c) and the ionizing ionic compound (d) used for forming the metallocene catalyst (a) are described.

The organoaluminum oxy-compound (c) for use in the invention may be aluminoxane conventionally known or a benzene-insoluble organoaluminum oxy-compound (c) exemplified in Japanese Patent Laid-Open Publication No. 78687/1990.

The aluminoxane is prepared by, for example, the following processes, and is generally recovered as a hydrocarbon solvent solution.

(1) An organoaluminum compound such as trialkylaluminum is added to an aromatic hydrocarbon solvent suspension of a compound containing adsorbed water or a salt containing water of crystallization, e.g., magnesium chloride hydrate, copper sulfate hydrate, aluminum sulfate hydrate, nickel sulfate hydrate or cerous chloride hydrate, to thereby allow the organoaluminum compound to react with the adsorbed water or the water of crystallization, followed by recovering aluminoxane as its aromatic hydrocarbon solvent solution.

(2) Water, ice or water vapor is allowed to directly act on an organoaluminum compound such as trialkylaluminum in a medium such as benzene, toluene, ethyl ether or tetrahydrofuran, followed by recovering aluminoxane as its aromatic hydrocarbon solvent solution.

(3) An organotin oxide such as dimethyltin oxide or dibutyltin oxide is allowed to react with an organoaluminum compound such as trialkylaluminum in a hydrocarbon medium such as decane, benzene or toluene.

Examples of the ionizing ionic compounds (d) includes Lewis acid, ionic compounds, borane compounds and carborane compounds. These ionizing ionic compounds are described in National Publications of international Patent No. 501950/1989 and No. 502036/1989, Japanese Patent Laid-Open Publications No. 179005/1991, No. 179006/1991, No. 207703/1991 and No. 207704/1991, and U.S. Pat. No. 5,321,106.

The Lewis acid which may be used as the ionizing ionic compound (d) is, for example, a compound represented by the formula $BR_3$ (each R is the same or different and is a phenyl group which may have a substituent such as fluorine, methyl or trifluoromethyl, or a fluorine atom). Examples of such compounds include trifluoroboron, triphenylboron, tris(4-fluorophenyl)boron, tris(3,5-difluorophenyl)boron, tris(4-fluoromethylphenyl)boron and tris(pentafluorophenyl)boron.

The ionic compound which may be used as the ionizing ionic compound (d) is a salt comprising a cationic compound and an anionic compound. The anionic compound reacts with the metallocene compound (b) to render the compound (b) cationic and to form an ion pair, whereby the transition metal cation seed is stabilized. Examples of such anions include organoboron compound anion, organoarsenic compound anion and organoaluminum compound anion. Preferable are anions which are relatively bulky and stabilize the transition metal cation seed. Examples of the cations include metallic cation, organometallic cation, carbonium cation, tripium cation, oxonium cation, sulfonium cation, phosphonium cation and ammonium cation. More specifically, there can be mentioned triphenylcarbenium cation, tributylammonium cation, N,N-dimethylammonium cation, ferrocenium cation, etc.

Of these, preferable are the ionic compounds containing a boron compound as the anionic compound, and examples thereof include trialkyl-substituted ammonium salts, N,N,-dialkylanilinium salts, dialkylammonium salts and triarylphosphonium salts.

Examples of the trialkyl-substituted ammonium salts include triethylammoniumtetra(phenyl)boron, tripropylammoniumtetra(phenyl)boron, tri(n-butyl)ammoniumtetra(phenyl)boron and trimethylammoniumtetra(p-tolyl)boron.

Examples of the N,N,-dialkylanilinium salts include N,N-dimethylaniliniumtetra(phenyl) boron.

Examples of the dialkylammonium salts include di(n-propyl)ammoniumtetra(pentafluorophenyl)boron and dicyclohexylammoniumtetra(phenyl)boron.

Examples of the triarylphosphonium salts include triphenylphosphoniumtetra(phenyl)boron, tri(methylphenyl)phosphoniumtetra(phenyl)boron and tri(dimethylphenyl)phosphoniumtetra(phenyl)boron.

Also available as the ionic compounds are triphenylcarbeniumtetrakis(pentafluorophenyl)borate, N,N-dimethylaniliniumtetrakis(pentafluorophenyl)borate and ferroceniumtetra(pentafluorophenyl)borate.

Examples of borane compounds which may be used as the ionizing ionic compound (d) include decaborane (14); salts of anions, such as bis[tri(n-butyl)ammonium]nonaborate and bis[tri(n-butyl)ammonium]decaborate; and salts of metallic borane anions, such as tri(n-butyl)ammoniumbis(dodecahydridododecaborate)cobaltate(III) and bis[tri(n-butyl)ammonium]bis(dodecahydridododecaborate)nickelate (III).

Examples of the carborane compounds which may be used as the ionizing ionic compound (d) include salts of anions, such as 4-carbanonaborane(14) and 1,3-dicarbanonaborane(13); and salts of metallic carborane anions, such as tri(n-butyl)ammoniumbis(nonahydrido-1,3-dicarbanonaborate)cobaltate(III) and tri(n-butyl)ammoniumbis(undecahydrido-7,8-dicarbaundecaborate)ferrate(III).

The ionizing ionic compounds (d) mentioned above can be used singly or in combination of two or more kinds.

The metallocene catalyst (a) used in the invention may optionally contain the following organoaluminum compound (e), in addition to the above components.

The organoaluminum compound (e) which is optionally used is, for example, an organoaluminum compound represented by the following formula (5):

$$(R^6)_n AlX_{3-n} \qquad (5)$$

wherein $R^6$ is a hydrocarbon group of 1 to 15 carbon atoms (preferably 1 to 4 carbon atoms), X is a halogen atom or hydrogen, and n is 1 to 3.

The hydrocarbon group of 1 to 15 carbon atoms is, for example, an alkyl group, a cycloalkyl group or an aryl group. Examples of such groups include methyl, ethyl, n-propyl, isopropyl and isobutyl.

Examples of the organoaluminum compounds include:

trialkylaluminums, such as trimethylaluminum, triethylaluminum, triisopropylaluminum, tri-n-butylaluminum, triisobutylaluminum and tri-sec-butylaluminum;

alkenylaluminums represented by the formula $(i-C_4H_9)_x Al_y(C_5H_{10})_z$ (wherein x, y and z are each a positive number, and $z \geq 2x$), such as isoprenylaluminum;

dialkylaluminum halides, such as dimethylaluminum chloride and diisobutylaluminum chloride;

dialkylaluminum hydrides, such as diisobutylaluminum hydride;

dialkylaluminum alkoxides, such as dimethylaluminum methoxide; and dialkylaluminum aryloxides, such as diethylaluminum phenoxide.

Copolymerization of ethylene, the aromatic vinyl compound, and if desired, the α-olefin of 3 to 20 carbon atoms may be carried out batchwise or continuously. When the copolymerization is carried out continuously, the metallocene catalyst (a) is used in the following concentration.

The concentration of the metallocene compound (b) in the polymerization system is in the range of usually 0.00005 to 0.1 mmol/liter (polymerization volume), preferably 0.0001 to 0.05 mmol/liter.

The organoaluminum oxy-compound (c) is used in such an amount that the ratio of the aluminum atom in the organoaluminum oxy-compound to the transition metal in the metallocene compound (b) in the polymerization system, Al/transition metal, is in the range of 0.1 to 10,000, preferably 1 to 5,000.

The ionizing ionic compound (d) is used in such an amount that the molar ratio of the ionizing ionic compound (d) to the metallocene compound (b) in the polymerization system (ionizing ionic compound (d)/metallocene compound (b)) is in the range of 0.1 to 20, preferably 1 to 10.

The organoaluminum compound (e) is used in such an amount that the concentration of the organoaluminum compound (e) is in the range of usually 0 to 5 mmol/liter (polymerization volume), preferably 0 to 2 mmol/liter.

The copolymerization reaction to prepare the α-olefin/aromatic vinyl compound random copolymer is carried out under the conditions of a temperature of usually −30 to +250° C., preferably 0 to 200° C., and a pressure of usually more than 0 and not more than 80 kg/cm² (gauge pressure), preferably more than 0 and not more than 50 kg/cm² (gauge pressure).

The reaction time (average residence time in case of continuous copolymerization) is in the range of usually 5 minutes to 3 hours, preferably 10 minutes to 1.5 hours, though it varies depending on the reaction conditions such as catalyst concentration and polymerization temperature.

In the preparation of the α-olefin/aromatic vinyl compound random copolymer, ethylene, the aromatic vinyl compound and optionally the α-olefin of 3 to 20 carbon atoms are fed to the polymerization system in such amounts that the copolymer of aforesaid specific composition can be obtained. In the copolymerization, a molecular weight modifier such as hydrogen can be used.

When ethylene, the aromatic vinyl compound and optionally the α-olefin of 3 to 20 carbon atoms are copolymerized as described above, the α-olefin/aromatic vinyl compound random copolymer is generally obtained as a polymerization solution containing it. The polymerization solution is treated in a conventional manner, whereby the α-olefin/aromatic vinyl compound random copolymer is obtained.

Next, the fuel oil composition according to the invention is described.

The fuel oil composition of the invention comprises:

a middle fraction fuel oil having a boiling point of 150 to 400° C., and an α-olefin/aromatic vinyl compound random copolymer obtained from ethylene, an aromatic vinyl compound, and optionally, an α-olefin of 3 to 20 carbon atoms.

Middle Fraction Fuel Oil

The middle fraction fuel oil for use in the invention has a boiling point of 150 to 400° C., and a typical example of the middle fraction fuel oil is gas oil or fuel oil A. Particularly preferable is a middle fraction fuel oil having a difference between the 90% running point and the initial boiling point of not less than 110° C. and, e.g., not more than 200° C., preferably 115 to 190° C., and having a cold filter plugging point of −10° C. to +10° C.

The middle fraction fuel oil may be used alone or as a mixture of two or more kinds.

α-Olefin/Aromatic Vinyl Compound Random Copolymer

In the present invention, the α-olefin/aromatic vinyl compound random copolymer is used as a fuel oil fluidity improver. This copolymer is a random copolymer of ethylene and an aromatic vinyl compound (ethylene/aromatic vinyl compound random copolymer) or a random copolymer of ethylene, an α-olefin of 3 to 20 carbon atoms and an aromatic vinyl compound (ethylene/α-olefin/aromatic vinyl compound random copolymer).

In the ethylene/aromatic vinyl compound random copolymer, the amount of constituent units derived from ethylene is in the range of 60 to 90% by mol, preferably 65 to 85% by mol, and the amount of constituent units derived from the aromatic vinyl compound is in the range of 10 to 40% by mol, preferably 15 to 35% by mol.

Examples of the aromatic vinyl compounds include styrene; mono- or polyalkylstyrenes, such as o-methylstyrene, m-methylstyrene, p-methylstyrene, o,p-dimethylstyrene, o-ethylstyrene, m-ethylstyrene and p-ethylstyrene; functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; 3-phenylpropylene; 4-phenylbutene; and α-methylstyrene. Of these, preferable is styrene or 4-methoxystyrene.

In the ethylene/aromatic vinyl compound random copolymer, α-olefins other than ethylene and the vinyl aromatic compound may be copolymerized. Examples of such α-olefins include α-olefins of 3 to 20 carbon atoms, such as propylene, 1-butene, 3-methyl-1-butene, 4-methyl-1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. Of these, preferable is propylene, 1-butene, 1-pentene, 1 -hexene or 1-octene. These α-olefins can be used singly or in combination of two or more kinds.

In the ethylene/α-olefin/aromatic vinyl compound random copolymer, the amount of constituent units derived from ethylene is in the range of 60 to 90% by mol, the amount of constituent units derived from the α-olefin of 3 to 20 carbon atoms is in the range of not more than 39% by mol, and the amount of constituent units derived from the aromatic vinyl compound is in the range of 1 to 40% by mol, with the proviso that the total amount of the constituent units derived from ethylene and the constituent units derived from the α-olefin is in the range of 60 to 99% by mol. It is preferable that the amount of constituent units derived from ethylene is in the range of 65 to 85% by mol, the amount of constituent units derived from the α-olefin of 3 to 20 carbon atoms is in the range of 10 to 32% by mol, and the amount of constituent units derived from the aromatic vinyl compound is in the range of 5 to 25% by mol, with the proviso that the total amount of the constituent units derived from ethylene and the constituent units derived from the α-olefin is in the range of 75 to 95% by mol.

When the amount of the constituent units derived from ethylene, the amount of constituent units derived from the α-olefin of 3 to 20 carbon atoms and the amount of the constituent units derived from the aromatic vinyl compound are within the above ranges, the α-olefin/aromatic vinyl compound random copolymer is excellent in lubricating properties such as low-temperature fluidity improving effects.

Of such copolymers as mentioned above, preferable is an α-olefin/aromatic vinyl compound random copolymer wherein the total amount of the constituent units derived from the α-olefin of 3 to 20 carbon atoms and the constituent units derived from the aromatic vinyl compound is in the range of 6 to 39% by mol, preferably 13 to 32% by mol, more preferably 15 to 30% by mol.

The α-olefin/aromatic vinyl compound random copolymer may be copolymerized with other monomers such as non-conjugated dienes. Examples of the non-conjugated dienes are the same as those previously described.

The α-olefin/aromatic vinyl compound random copolymer has an intrinsic viscosity [η], as measured in decalin at 135° C., of 0.01 to 1.0 dl/g, preferably 0.05 to 0.5 dl/g.

In the fuel oil composition, the α-olefin/aromatic vinyl compound random copolymer functioning as the fuel oil fluidity improver is contained in an amount of 0.005 to 5.0% by weight, preferably 0.01 to 1.0% by weight.

In the α-olefin/aromatic vinyl compound random copolymer for use in the invention, the proportion of the constituent units for forming sequences of two constituent units derived from the aromatic vinyl compound to all the constituent units derived from the aromatic vinyl compound is desired to be not more than 1%, preferably not more than 0.1%. The proportion of the sequences of two constituent units derived from the aromatic vinyl compound can be determined by means of $^{13}$C-NMR.

The α-olefin/aromatic vinyl compound random copolymer can be prepared by the aforementioned process for preparing an α-olefin/aromatic vinyl compound random copolymer.

EFFECT OF THE INVENTION

The lubricating oil and the first lubricating oil composition according to the invention are excellent in compatibility with lubricating oil additives as well as in viscosity properties, heat stability, oxidation stability and abrasion resistance.

The second lubricating oil composition according to the invention has excellent lubricating oil properties because the composition comprises a base oil composed of a mineral oil and/or a hydrocarbon synthetic oil and a viscosity index improver or a base oil each comprising the specific α-olefin/aromatic vinyl compound random copolymer.

The third lubricating oil composition according to the invention has excellent lubricating oil properties because the composition comprises a base oil composed of a mineral oil and/or a hydrocarbon synthetic oil, a compatibility improver or a base oil each comprising the specific low-molecular weight α-olefin/aromatic vinyl compound random copolymer, a lubricating oil additive, and optionally, a viscosity index improver comprising the specific α-olefin/aromatic vinyl compound random copolymer.

There are also provided by the invention a viscosity index improver comprising the specific α-olefin/aromatic vinyl compound random copolymer, and a lubricating oil compatibility improver comprising the specific low-molecular weight α-olefin/aromatic vinyl compound random copolymer.

The α-olefin/aromatic vinyl type fuel oil fluidity improver for constituting the fuel oil composition of the invention prevents growth of wax crystals in the middle fraction fuel oil to thereby inhibit viscosity increase of the middle fraction fuel oil and to lower the cold filter plugging point (CFPP) and the pour point. Moreover, the fluidity improver has excellent lubricating properties. By virtue of these advantageous properties, fuel supply and air supply can be stabilized to achieve safety operation, and abrasion of fuel injection nozzles can be inhibited.

Accordingly, the fuel oil composition of the invention is prevented from viscosity increase of the middle fraction fuel oil and is lowered in the cold filter plugging point and the pour point. Besides, the fuel oil composition contributes to inhibition of abrasion of fuel injection nozzles.

EXAMPLE

The present invention is further described with reference to the following examples, but it should be construed that the invention is in no way limited to those examples.

Example A-1

Synthesis of α-Olefin/Aromatic Vinyl Compound Random Copolymer

A 1-liter glass reactor equipped with a cooling tube and a stirrer was thoroughly purged with nitrogen. To the reactor were introduced 425 ml of toluene and 75 ml of styrene. Then, the reactor was saturated with ethylene while stirring. The temperature of the system was elevated to 40° C., and to the system were added 30.0 mM of methylaluminoxane (TOHSO AQUZO Co., 10 wt % toluene solution) and 0.06 mM of (t-butylamide)dimethyl(tetramethyl-$\eta^5$-cyclopentadienyl)silanetitanium dichloride (0.01 mM toluene solution) so that the molar ratio of Al to the catalyst became 500. Then, ethylene was continuously fed at a rate of 100 N liter/hr to perform polymerization at 80° C. for 60 minutes.

After the polymerization was completed, 250 ml of isobutyl alcohol and 10 ml of hydrochloric acid were added, and the mixture was stirred at 80° C. for 30 minutes. The reaction solution containing isobutyl alcohol was transferred into a separatory funnel, washed twice with 250 ml of water, and separated into an oil phase and an aqueous phase. The oil phase portion was added to 3 liters of methanol to precipitate a polymer. The precipitated polymer was vacuum dried at 130° C. for 12 hours to obtain 20 g of an ethylene/styrene random copolymer.

In the copolymer (a), the molar ratio between ethylene and styrene (ethylene/styrene) was 69/31. The copolymer (a) had an intrinsic viscosity [η], as measured in decalin at 135° C., of 0.3 dl/g.

The viscosity of the copolymer, the total acid number thereof and the properties thereof after heat resistance test are set forth in Table 1.

The copolymer was used as a synthetic lubricating oil. As a result, the copolymer exhibited good performance.

Example A-2

Synthesis of α-Olefin/Aromatic Vinyl Compound Random Copolymer

An ethylene/propylene/styrene random copolymer was synthesized in the same manner as in Example A-1, except that 450 ml of toluene and 50 ml of styrene were introduced into the reactor, and ethylene and propylene were continuously fed at rates of 95 N liter/hr and 5 Nl/hr, respectively.

In the copolymer, the molar ratio among ethylene, propylene and styrene (ethylene/propylene/styrene) was 69/11/20. The copolymer (b) had an intrinsic viscosity [η], as measured in decalin at 135° C., of 0.4 dl/g.

The viscosity of the copolymer, the total acid number thereof and the properties thereof after heat resistance test are set forth in Table 1.

The copolymer was used as a synthetic lubricating oil. As a result, the copolymer exhibited good performance.

Example A-3

Synthesis of α-Olefin/Aromatic Vinyl Compound Random Copolymer

An ethylene/propylene/styrene random copolymer was synthesized in the same manner as in Example A-1, except that 450 ml of toluene and 50 ml of styrene were introduced into the reactor, and ethylene and propylene were continuously fed at rates of 85 N liter/hr and 15 Nl/hr, respectively.

In the copolymer, the molar ratio among ethylene, propylene and styrene (ethylene/propylene/styrene) was 62/19/19. The copolymer (c) had an intrinsic viscosity [η], as measured in decalin at 135° C., of 0.4 dl/g.

The viscosity of the copolymer, the total acid number thereof and the properties thereof after heat resistance test are set forth in Table 1.

The copolymer was used as a synthetic lubricating oil. As a result, the copolymer exhibited good performance.

Example A-4

Synthesis of α-Olefin/Aromatic Vinyl Compound Random Copolymer

A 1-liter glass reactor equipped with a cooling tube and a stirrer was thoroughly purged with nitrogen. To the reactor were introduced 425 ml of toluene and 75 ml of styrene. Then, the reactor was saturated with ethylene while stirring. The temperature of the system was elevated to 40° C., and to the system were added 30.0 mM of methylaluminoxane (TOHSO AQUZO Co., 10 wt % toluene solution) and 0.06 mM of [(C$_5$Me$_4$)SiMe$_2$(N-t-Bu)]TiCl$_2$ ((t-butylamide)dimethyl(tetramethyl-$\eta^5$-cyclopentadienyl)silanetitanium dichloride) (0.01 mM toluene solution) so that the molar ratio of Al to the catalyst became 500. Then, ethylene, propylene and hydrogen were continuously fed at rates of 85 N liter/hr, 15 N liter/hr and 2 N liter/hr, respectively, to perform polymerization at 80° C. for 60 minutes. After the polymerization was completed, 250 ml of isobutyl alcohol and 10 ml of hydrochloric acid were added, and the mixture was stirred at 80° C. for 30 minutes. The reaction solution containing isobutyl alcohol was transferred into a separatory funnel, washed twice with 250 ml of water, and separated into an oil phase and an aqueous phase. The oil phase portion was added to 3 liters of methanol to precipitate a polymer. The precipitated polymer was vacuum dried at 130° C. for 12 hours to obtain an ethylene/propylene/styrene random copolymer.

In the copolymer, the molar ratio among ethylene, propylene and styrene (ethylene/propylene/styrene) was 68/29/3. The copolymer (d) had an intrinsic viscosity [η], as measured in decalin at 135° C., of 0.1 dl/g.

The viscosity of the copolymer, the total acid number thereof and the properties thereof after heat resistance test are set forth in Table 1.

The copolymer was used as a synthetic lubricating oil. As a result, the copolymer exhibited good performance.

Example A-5

Synthesis of α-Olefin/Aromatic Vinyl Compound Random Copolymer

A 1-liter glass reactor equipped with a cooling tube and a stirrer was thoroughly purged with nitrogen. To the reactor were introduced 425 ml of toluene and 75 ml of styrene. Then, the reactor was saturated with ethylene while stirring. The temperature of the system was elevated to 80° C., and to the system were added 30.0 mM of methylaluminoxane (TOHSO AQUZO Co., 10 wt % toluene solution) and 0.06 mM of [(C$_5$Me$_4$)SiMe$_2$(N-t-Bu)]TiCl$_2$ ((t-butylamide)dimethyl(tetramethyl-$\eta^5$-cyclopentadienyl)silanetitanium dichloride) (0.01 mM toluene solution) so that the molar ratio of Al to the catalyst became 500. Then, ethylene, propylene and hydrogen were continuously fed at rates of 51 N liter/hr, 9 N liter/hr and 40 N liter/hr, respectively, to perform polymerization at 80° C. for 60 minutes.

After the polymerization was completed, 250 ml of isobutyl alcohol and 10 ml of hydrochloric acid were added, and the mixture was stirred at 80° C. for 30 minutes. The reaction solution containing isobutyl alcohol was transferred into a separatory funnel, washed twice with 250 ml of water, and separated into an oil phase and an aqueous phase. The oil phase portion was added to 3 liters of methanol to precipitate a polymer. The precipitated polymer was vacuum dried at 130° C. for 12 hours to obtain an ethylene/propylene/styrene random copolymer.

In the copolymer, the molar ratio among ethylene, propylene and styrene (ethylene/propylene/styrene) was 69/28/3. The copolymer (e) had an intrinsic viscosity [η], as measured in decalin at 135° C., of 0.03 dl/g.

The viscosity of the copolymer, the total acid number thereof and the properties thereof after heat resistance test are set forth in Table 1.

The copolymer was used as a synthetic lubricating oil. As a result, the copolymer exhibited good performance.

Example A-6

An ethylene/propylene/styrene random copolymer was synthesized in the same manner as in Example A-5, except that isopropylidenebisindenylzirconium dichloride was used in place of the (t-butylamide)dimethyl(tetramethyl-η$^5$-cyclopentadienyl)silanetitanium dichloride.

In the copolymer, the molar ratio among ethylene, propylene and styrene (ethylene/propylene/styrene) was 72/25/3. The copolymer (f) had an intrinsic viscosity [η], as measured in decalin at 135° C., of 0.01 dl/g.

The viscosity of the copolymer, the total acid number thereof and the properties thereof after heat resistance test are set forth in Table 1.

The copolymer was used as a synthetic lubricating oil. As a result, the copolymer exhibited good performance.

Example A-7

95.0 Parts by weight of the ethylene/propylene/styrene random copolymer (e) obtained in Example A-5 and 5.0 parts by weight of a load carrying additive were blended at about 60° C. to prepare a blended oil.

The kinematic viscosity and appearance (compatibility with the load carrying additive) of the blended oil are set forth in Table 2.

Comparative Example A-1

A blended oil was prepared in the same manner as in Example A-7, except that PAO-40 (oligomer of 1-decene, available from Mobil Co., trade name: SHF-401) was used in place of the ethylene/propylene/styrene random copolymer (e) obtained in Example A-5.

The kinematic viscosity and appearance (compatibility with the load carrying additive) of the blended oil are set forth in Table 2.

Comparative Example A-2

90.0 Parts by weight of PAO-40 (oligomer of 1-decene), 5.0 parts by weight of an ester (DIDA: diisodecyl adipate, available from Daihachi Kagaku Kogyosho) and 5.0 parts by weight of a load carrying additive were blended at about 60° C. to prepare a blended oil.

The kinematic viscosity and appearance (compatibility with the load carrying additive) of the blended oil are set forth in Table 2.

TABLE 1

| | Examples | | | | | |
|---|---|---|---|---|---|---|
| | A-1 | A-2 | A-3 | A-4 | A-5 | A-6 |
| Intrinsic viscosity (η) (dl/g) | 0.3 | 0.4 | 0.4 | 0.1 | 0.03 | 0.01 |
| Viscosity *1 (mPa·S) 100° C. | 16,500 | 49,000 | 54,000 | 150 | 39 | 9.5 |
| Total acid number *2 (mg-KOH/g) | 0.18 | 0.11 | 0.13 | 0.05 | 0.04 | 0.02 |
| Lubricating properties | | | | | | |
| Four ball load resistance test *3 (kg/cm$^2$) | — | — | — | 4.0 | 3.0 | 2.5 |
| Properties after heat resistance test *4 (200° C. × 6.5 hrs) | | | | | | |
| Evaporation loss *5 (wt %) | 0.8 | 0.5 | 0.5 | 3.0 | 13.0 | 20.5 |
| Total acid number *6 (mg-KOH/g) | 3.80 | 4.30 | 4.10 | 4.50 | 4.00 | 4.05 |

Remarks:
*1: Measured by Brookfield viscometer (DV-II).
*2: Measured by the method defined by JIS K 2501.
*3: Measured by the method defined by JIS K 2519.
*4: The heat resistance test was measured by the original method of our company, that is, 30 g of a sample contained in a cylindrical glass container (diameter: 55 mm, height 35 mm) was heated in an air oven at 200° C. for 6.5 hours.
*5: The loss in weight after the heat resistance test (*4) was measured.
*6: Measured by the method defined by JIS K 2501 after the heat resistance test (*4).

TABLE 2

| | Example | Compar. Example | |
|---|---|---|---|
| | A-7 | A-1 | A-2 |
| Component ratio of blended oil (wt %) | | | |
| Copolymer of Ex. A-5 | 95.0 | | |
| PAO-40 | | 95.0 | 90.0 |
| Ester (DIDA) | | | 5.0 |
| Load resistant additive | 5.0 | 5.0 | 5.0 |
| Total (wt %) | 100.0 | 100.0 | 100.0 |
| Properties of blended oil | | | |
| Kinematic viscosity *1 (mm$^2$/S)100° C. | 37.5 | 36.5 | 34.0 |
| Appearance *2 (compatibility with additives) | good | bad | good |

Remarks:
*1: Measured by the method defined by JIS K 2283.
*2: Evaluated by visual observation.

Example B-1

Synthesis of α-Olefin/Aromatic Vinyl Compound Random Copolymer

A 1-liter glass reactor equipped with a cooling tube and a stirrer was thoroughly purged with nitrogen. To the reactor were introduced 425 ml of toluene and 75 ml of styrene. Then, the reactor was saturated with ethylene while stirring. The temperature of the system was elevated to 40° C., and to the system were added 30.0 mM of methylaluminoxane (TOHSO AQUZO Co., 10 wt % toluene solution) and 0.06 mM of (t-butylamide)dimethyl(tetramethyl-η$^5$- cyclopentadienyl)silanetitanium dichloride (0.01 mM toluene solution) so that the molar ratio of Al to the catalyst became 500. Then, ethylene was continuously fed at a rate of 100 N liter/hr to perform polymerization at 80° C. for 60 minutes.

After the polymerization was completed, 250 ml of isobutyl alcohol and 10 ml of hydrochloric acid were added, and the mixture was stirred at 80° C. for 30 minutes. The reaction solution containing isobutyl alcohol was transferred into a separatory funnel, washed twice with 250 ml of water, and separated into an oil phase and an aqueous phase. The oil phase portion was added to 3 liters of methanol to precipitate a polymer. The precipitated polymer was vacuum dried at 130° C. for 12 hours to obtain 24 g of an ethylene/styrene random copolymer.

In the copolymer, the molar ratio between ethylene and styrene (ethylene/styrene) was 71/29. The copolymer (g) had an intrinsic viscosity $[\eta]$, as measured in decalin at 135° C., of 1.1 dl/g.

Preparation of Lubricating Oil Composition

The copolymer (g) was dissolved in a mineral oil A (available from Fuji Kosansha, 100 neutral oil) under heating in a concentration of 10% by weight based on the mineral oil A, to prepare a viscous liquid. The viscous liquid was blended with a mineral oil B (available from Fuji Kosansha, 150 neutral oil) in such a manner that the 100° C. viscosity of the resulting blended oil became about 11 mm$^2$/S. The resulting blended oil was measured on the kinematic viscosity, viscosity index and oxidation stability. The results are set forth in Table 3.

Example B-2

Synthesis of α-Olefin/Aromatic Vinyl Compound Random Copolymer

An ethylene/propylene/styrene random copolymer was synthesized in the same manner as in Example B-1, except that 450 ml of toluene and 50 ml of styrene were introduced into the reactor, and ethylene and propylene were continuously fed at rates of 95 N liter/hr and 5 Nl/hr, respectively.

In the copolymer, the molar ratio among ethylene, propylene and styrene (ethylene/propylene/styrene) was 71/10/19. The copolymer (h) had an intrinsic viscosity $[\eta]$, as measured in decalin at 135° C., of 1.5 dl/g.

Preparation of Lubricating Oil Composition

A blended oil was prepared in the same manner as in Example B-1, except that the copolymer (h) was used.

The kinematic viscosity, viscosity index and oxidation stability of the blended oil are set forth in Table 3.

Example B-3

Synthesis of α-Olefin/Aromatic Vinyl Compound Random Copolymer

An ethylene/propylene/styrene random copolymer was synthesized in the same manner as in Example B-1, except that 450 ml of toluene and 50 ml of styrene were introduced into the reactor, and ethylene and propylene were continuously fed at rates of 85 N liter/hr and 15 Nl/hr, respectively.

In the copolymer, the molar ratio among ethylene, propylene and styrene (ethylene/propylene/styrene) was 59/21/20. The copolymer (i) had an intrinsic viscosity $[\eta]$, as measured in decalin at 135° C., of 1.6 dl/g.

Preparation of Lubricating Oil Composition

A blended oil was prepared in the same manner as in Example B-1, except that the copolymer (i) was used.

The kinematic viscosity, viscosity index and oxidation stability of the blended oil are set forth in Table 3.

Example B-4

A blended oil was prepared in the same manner as in Example B-1, except that the viscous liquid consisting of the ethylene/styrene random copolymer (g) and the mineral oil A (available from Fuji Kosansha, 100 neutral oil) was blended with low-viscosity PAO-6 (oligomer of 1-decene, available from Shinnittetsu Kagaku K. K., trade name: Shinfluid 61) in place of the mineral oil B in such a manner that the 100° C. viscosity of the resulting blended oil became about 11 mm$^2$/S. The resulting blended oil was measured on the kinematic viscosity, viscosity index and oxidation stability. The results are set forth in Table 3.

Example B-5

A viscous liquid was prepared in the same manner as in Example B-1, except that the ethylene/styrene random copolymer (g) was dissolved in low-viscosity PAO-4 (oligomer of 1-decene, available from Shinnittetsu Kagaku K. K., trade name: Shinfluid 41) in place of the mineral oil A under heating in a concentration of 10% by weight based on the PAO-4. Then, similarly to Example B-4, the viscous liquid was blended with low-viscosity PAO-6 (oligomer of 1-decene, available from Shinnittetsu Kagaku K. K., trade name: Shinfluid 61) in such a manner that the 100° C. viscosity of the resulting blended oil became about 11 mm$^2$/S. The resulting blended oil was measured on kinematic viscosity, viscosity index and oxidation stability. The results are set forth in Table 3.

Example B-6

The viscous liquid obtained in Example B-1, which was a mixture of the ethylene/styrene random copolymer (g) and the mineral oil A, was blended with a detergent-dispersant, a low-molecular weight α-olefin/aromatic vinyl compound random copolymer (ethylene/propylene/styrene random copolymer, ethylene/propylene/styrene molar ratio: 69/11/20, intrinsic viscosity $[\eta]$ measured in decalin at 135° C.: 0.2 dl/g) as a compatibility improver and a base oil PAO-6 (oligomer of 1-decene, available from Shinnittetsu Kagaku K. K., trade name: Shinfluid 61), to prepare a blended oil.

The kinematic viscosity, viscosity index and appearance (compatibility with additive) of the blended oil are set forth in Table 4.

Comparative Example B-1

A blended oil was prepared in the same manner as in Example B-6, except that an ester (DIDA: diisodecyl adipate, available from Daihachi Kagaku Kogyosho) was used as the compatibility improver in place of the low-molecular weight α-olefin/aromatic vinyl compound random copolymer.

The kinematic viscosity, viscosity index and appearance (compatibility with additive) of the blended oil are set forth in Table 4.

Comparative Example B-2

A blended oil was prepared in the same manner as in Example B-6, except that the low-molecular weight α-olefin/aromatic vinyl compound random copolymer as the compatibility improver was not used.

The kinematic viscosity, viscosity index and appearance (compatibility with additive) of the blended oil are set forth in Table 4.

TABLE 3

| | Examples | | | | |
|---|---|---|---|---|---|
| | B-1 | B-2 | B-3 | B-4 | B-5 |
| Component ratio of viscous liquid (wt %) | | | | | |
| Copolymer of Ex. B-1 | 10.0 | | | 10.0 | 10.0 |
| Copolymer of Ex. B-2 | | 10.0 | | | |
| Copolymer of Ex. B-3 | | | 10.0 | | |
| Mineral oil A (100 netural) | 90.0 | 90.0 | 90.0 | 90.0 | |
| PAO-4 | | | | | 90.0 |
| Total (wt %) | 100.0 | 100.0 | 100.0 | 100.0 | 100.0 |
| Component ratio of blended oil (wt %) | | | | | |
| Viscous liquid | 24.0 | 18.5 | 15.5 | 25.3 | 25.8 |
| Mineral oil B | 76.0 | 81.5 | 84.5 | | |
| PAO-6 | | | | 74.7 | 74.2 |
| Total (wt %) | 100.0 | 100.0 | 100.0 | 100.0 | 100.0 |
| Properties of blended oil | | | | | |
| Kinematic viscosity *1 (mm²/s) | | | | | |
| 100° C. | 11.10 | 10.99 | 11.04 | 11.02 | 10.96 |
| 40° C. | 68.8 | 67.5 | 68.1 | 61.9 | 60.3 |
| Viscosity index *2 | 153 | 154 | 153 | 172 | 176 |
| Properties after oxidation test *3 | | | | | |
| Kinematic viscosity ratio *4 (40° C.) | 0.66 | 0.68 | 0.65 | 0.75 | 0.73 |
| Total acid number *5 (mg-KOH/g) | 5.6 | 5.1 | 5.0 | 4.0 | 3.8 |

Remarks:
*1: Measured by the method defined by JIS K 2283.
*2: Calculated by the method defined by JIS K 2283.
*3: Evaluated in accordance with the method defined by JIS K 2514. (165.5° C. × 48 hrs)
*4: Measured by the method defined by JIS K 2283. 40° C. kinematic viscosity after oxidation test/40° C. kinematic viscosity before oxidation test.
*5: Measured by the method defined by JIS K 2501.

TABLE 4

| | Example | Comp. Example | |
|---|---|---|---|
| | B-6 | B-1 | B-2 |
| Component ratio of blended oil (wt %) | | | |
| (1) Viscous liquid (mixture of copolymer of Ex. B-1 and mineral oil A) | 14.0 | 14.0 | 14.0 |
| (2) Detergent-dispersant (SH grade) | 10.5 | 10.5 | 10.5 |
| (3) Compatibility improver | | | |
|   (i) Low-molecular weight α-olefin/aromatic vinyl compound random copolymer | 5.0 | | |
|   (ii) Ester (DIDA) | | 5.0 | |
| (4) Base Oil (PAO-6) | 70.5 | 70.5 | 75.5 |
| Total (wt %) | 100.0 | 100.0 | 100.0 |

TABLE 4-continued

| | Example | Comp. Example | |
|---|---|---|---|
| | B-6 | B-1 | B-2 |
| Properties of blended oil | | | |
| Kinematic viscosity *1 (mm²/s) | | | |
| 100° C. | 12.4 | 10.2 | 10.8 |
| 40° C. | 72.2 | 56.1 | 62.1 |
| Viscosity index *2 | 170 | 172 | 166 |
| Appearance *3 (compatibility with additive) | good | good | bad |

Remarks:
*1: Measured by the method defined by JIS K 2283.
*2: Calculated by the method defined by JIS K 2283.
*3: Evaluated by visual observation.

Example C-1

(1) Synthesis of ethylene/styrene random copolymer (A)

A 1-liter glass reactor equipped with a cooling tube and a stirrer was thoroughly purged with nitrogen. To the reactor were introduced 450 ml of toluene and 50 ml of styrene. Then, the reactor was saturated with ethylene while stirring. The temperature of the system was elevated to 40° C., and to the system were added 30.0 mM of methylaluminoxane (TOHSO AQUZO Co., 10 wt % toluene solution) and 0.06 mM of $[(C_5Me_4)SiMe_2(N\text{-}t\text{-}Bu)]TiCl_2$ ((t-butylamide) dimethyl(tetramethyl-$\eta^5$-cyclopentadienyl)silanetitanium dichloride) (0.01 mM toluene solution) so that the molar ratio of Al to the catalyst became 500. Then, ethylene was continuously fed at a rate of 100 NL/hr to perform polymerization at 80° C. for 60 minutes. After the polymerization was completed, 250 ml of isobutyl alcohol and 10 ml of hydrochloric acid were added, and the mixture was stirred at 80° C. for 30 minutes. The reaction solution containing isobutyl alcohol was transferred into a separatory funnel, washed twice with 250 ml of water, and separated into an oil phase and an aqueous phase. The oil phase portion was added to 3 liters of methanol to precipitate a polymer. The precipitated polymer was vacuum dried at 130° C. for 12 hours to obtain an ethylene/styrene random copolymer (A).

In the copolymer (A), the molar ratio between ethylene and styrene (ethylene/styrene) was 81/19. The copolymer (A) had an intrinsic viscosity [η], as measured in decalin at 135° C. of 0.4 dl/g.

(2) Evaluation on performance of fuel oil composition

To a commercially available gas oil No. 2 (sulfur content: 0.1% by weight), 0.02% by weight of the ethylene/styrene random copolymer (A) was added. The resulting composition was evaluated on the pour point, cold filter plugging point (CFPP) and lubricating properties.

The results are set forth in Table 5.

Example C-2

A fuel oil composition was prepared in the same manner as in Example C-1, except that the content of the ethylene/styrene random copolymer (A) in the fuel oil composition was varied to 0.10% by weight. The composition was evaluated in the same manner as in Example C-1.

The results are set forth in Table 5.

Example C-3

(1) Synthesis of ethylene/propylene/styrene random copolymer (B)

An ethylene/propylene/styrene random copolymer (B) was prepared in the same manner as in Example C-1, except that 4,750 ml of toluene and 25 ml of styrene were introduced into the reactor, and ethylene and propylene were continuously fed at rates of 100 NL/hr and 5 NL/hr, respectively.

In the ethylene/propylene/styrene random copolymer (B), the molar ratio among ethylene, propylene and styrene (ethylene/propylene/styrene) was 78/11/11. The copolymer (B) had an intrinsic viscosity [η], as measured in decalin at 135° C., of 0.3 dl/g.

(2) Evaluation on performance of fuel oil composition

Evaluation of a fuel oil composition was carried out in the same manner as in Example C-1, except that the ethylene/propylene/styrene random copolymer (B) was used.

The results are set forth in Table 5.

Example C-4

A fuel oil composition was prepared in the same manner as in Example C-3, except that the content of the ethylene/propylene/styrene random copolymer (B) in the fuel oil composition was varied to 0.10% by weight. The composition was evaluated in the same manner as in Example C-3.

The results are set forth in Table 5.

Example C-5

(1) Synthesis of ethylene/propylene/styrene random copolymer (C)

An ethylene/propylene/styrene random copolymer (C) was prepared in the same manner as in Example C-1, except that 4,880 ml of toluene and 12 ml of styrene were introduced into the reactor, and ethylene and propylene were continuously fed at rates of 95 NL/hr and 6 NL/hr, respectively.

In the ethylene/propylene/styrene random copolymer (C), the molar ratio among ethylene, propylene and styrene (ethylene/propylene/styrene) was 79/16/5. The copolymer (C) had an intrinsic viscosity [η], as measured in decalin at 135° C., of 0.4 dl/g.

(2) Evaluation on performance of fuel oil composition

Evaluation of a fuel oil composition was carried out in the same manner as in Example C-1, except that the ethylene/propylene/styrene random copolymer (C) was used.

The results are set forth in Table 5.

Comparative Example C-1

The commercially available gas oil No. 2 used in Example C-1 was evaluated on the pour point, cold filter plugging point and lubricating properties.

The results are set forth in Table 5.

Example C-6

A fuel oil composition was prepared in the same manner as in Example C-3, except that the gas oil was replaced with a low-sulfur gas oil (sulfur content: not more than 0.01% by weight). The composition was evaluated in the same manner as in Example C-3.

The results are set forth in Table 6.

Example C-7

A fuel oil composition was prepared in the same manner as in Example C-6, except that the content of the ethylene/propylene/styrene random copolymer in the fuel oil composition was varied to 0.10% by weight. The composition was evaluated in the same manner as in Example C-6.

The results are set forth in Table 6.

Comparative Example C-2

The same gas oil (sulfur content: not more than 0.01% by weight) as used in Example C-7 was evaluated in the same manner as described above.

The results are set forth in Table 6.

TABLE 5

|  | Example | | | | | Comp. Exam. |
|---|---|---|---|---|---|---|
|  | C-1 | C-2 | C-3 | C-4 | C-5 | C-1 |
| Component ratio of fuel oil composition (wt %) | | | | | | |
| α-olefin/aromatic vinyl compound random copolymer | 0.02 | 0.10 | 0.02 | 0.10 | 0.02 | — |
| Gas oil (sulfer content: 0.1 wt %) | 99.98 | 99.90 | 99.98 | 99.90 | 99.98 | 100.0 |
| Total (wt %) | 100.0 | 100.0 | 100.0 | 100.0 | 100.0 | 100.0 |
| Properties of fuel oil composition | | | | | | |
| Pour point (° C.) | −22.5 | −25.0 | −25.0 | −30.0 | −25.0 | −15.0 |
| Cold filter plugging point (° C.) | −7 | −8 | −7 | −9 | −8 | −3 |
| Lubricating properties (friction coefficient) | 0.238 | 0.226 | 0.234 | 0.222 | 0.225 | 0.260 |

TABLE 6

|  | Examples | | Comp. Example |
|---|---|---|---|
|  | C-6 | C-7 | C-2 |
| Component ratio of fuel oil composition (wt %) | | | |
| α-olefin/aromatic vinyl compound random copolymer | 0.02 | 0.10 | — |
| Low-sulfur gas oil (sulfur content: not more than 0.01 wt %) | 99.98 | 99.90 | 100.0 |
| Total (wt %) | 100.00 | 100.00 | 100.0 |
| Properties of fuel oil composition | | | |
| Pour point (° C.) | −25.0 | −30.0 | −17.5 |
| Cold filter plugging point (° C.) | −8 | −9 | −4 |
| Lubricating properties (friction coefficient) | 0.246 | 0.234 | 0.272 |

Evaluation methods:

The pour point was measured in accordance with JIS K 2269.

The cold filter plugging point was measured in accordance with JIS K 2288.

The lubricating properties were evaluated based on the friction coefficient which was measured by a SRV friction tester (available from Optimol Co.) when the specimen was subjected to vibrating for 30 min. under the conditions of a test starting temperature of 60° C., specimen contact of steel ball/plate, a load of 20 N, a frequency of 50 Hz and an amplitude of 1 mm.

What is claimed is:

1. A fuel oil composition comprising:

a middle fraction fuel oil having a boiling point of 150 to 400° C., and an α-olefin/aromatic vinyl fuel oil fluidity improver comprising an α-olefin/aromatic vinyl compound random copolymer which comprises 60 to 90% by mol of constituent units derived from ethylene, 0 to 39% by mol of constituent units derived from an α-olefin of 3 to 20 carbon atoms and 1 to 40% by mol of constituent units derived from an aromatic vinyl compound, with the proviso that the total amount of the constituent units derived from ethylene and the constituent units derived from the α-olefin is 60 to 99% by mol, and has an intrinsic viscosity [η], as measured in decalin at 135° C., of 0.01 to 1.0 dl/g.

* * * * *